(12) United States Patent
Liu et al.

(10) Patent No.: US 12,269,757 B2
(45) Date of Patent: Apr. 8, 2025

(54) HIGHWAY SPONGE-TYPE COMPOSITE SIDE DITCH CARBON NEUTRALIZATION SYSTEM AND METHOD THEREOF

(71) Applicant: China Academy of Transportation Sciences, Beijing (CN)

(72) Inventors: Xuexin Liu, Beijing (CN); Jiding Chen, Beijing (CN); Shuangcheng Tao, Beijing (CN); Yaping Kong, Beijing (CN); Xinjun Wang, Beijing (CN); Shuohan Gao, Beijing (CN); Shanqian Huang, Beijing (CN)

(73) Assignee: China Academy of Transportation Sciences (CN)

( * ) Notice: Subject to any disclaimer, the term of this patent is extended or adjusted under 35 U.S.C. 154(b) by 315 days.

(21) Appl. No.: 17/720,315

(22) Filed: Apr. 14, 2022

(65) Prior Publication Data

US 2022/0332601 A1 Oct. 20, 2022

(30) Foreign Application Priority Data

Apr. 16, 2021 (CN) .......................... 202110410338.4

(51) Int. Cl.
*C02F 1/28* (2023.01)
*C02F 1/40* (2023.01)
(Continued)

(52) U.S. Cl.
CPC .............. *C02F 1/288* (2013.01); *C02F 1/40* (2013.01); *C02F 3/348* (2013.01);
(Continued)

(58) Field of Classification Search
CPC ...... C02F 1/288; C02F 1/40; C02F 2001/007; C02F 2101/10; C02F 2307/00;
(Continued)

(56) References Cited

U.S. PATENT DOCUMENTS 3,917,528 A * 11/1975 Orban ................ B01D 17/0202
134/6
2012/0010070 A1 * 1/2012 Blucher ............. B01J 20/28019
502/402

FOREIGN PATENT DOCUMENTS

CN 105502801 A 4/2016
CN 105600951 A * 5/2016 ................ C02F 3/34
(Continued)

OTHER PUBLICATIONS

Machine generated translation of CN-110847332-A (Year: 2020).*
(Continued)

*Primary Examiner* — Magali P Slawski
*Assistant Examiner* — Bernadette Karen McGann

(57) ABSTRACT

The highway sponge-type composite side ditch carbon neutralization system of the present invention includes three units, i.e., a silt pre-sedimentation channel, a filtering and oil-absorbing channel and an ecologic purification channel which are connected horizontally and successively. These three units work together to jointly complete the low-impact development functions of runoff collection, guide and drainage, purification and utilization, carbon emission is reduced by adopting various technical measures, the carbon sink effect is improved, and the full-life-cycle carbon neutralization effect from raw material production, construction to operation can be realized.

8 Claims, 2 Drawing Sheets

(51) Int. Cl.
*C02F 3/34* (2023.01)
*C02F 101/10* (2006.01)

(52) U.S. Cl.
CPC .... *C02F 2101/10* (2013.01); *C02F 2201/002* (2013.01); *C02F 2305/14* (2013.01); *C02F 2307/00* (2013.01)

(58) Field of Classification Search
CPC ............ C02F 3/348; C02F 9/00; C02F 1/001; C02F 1/28; C02F 2103/007; C02F 2201/002; C02F 2305/14; C02F 3/302; C02F 3/32; C02F 3/327; C02F 3/34
See application file for complete search history.

(56) References Cited

FOREIGN PATENT DOCUMENTS

| | | | |
|---|---|---|---|
| CN | 105621617 A | | 6/2016 |
| CN | 205294963 U | | 6/2016 |
| CN | 207176864 U | * | 4/2018 |
| CN | 108040809 A | * | 5/2018 |
| CN | 208200702 U | * | 12/2018 |
| CN | 110746055 A | * | 2/2020 |
| CN | 110847332 A | * | 2/2020 |
| CN | 211942355 U | * | 11/2020 |
| CN | 112544396 A | * | 3/2021 |
| CN | 212670173 U | * | 3/2021 |

OTHER PUBLICATIONS

Machine generated translation of CN-207176864-U (Year: 2018).*
Machine generated translation of CN-110746055-A (Year: 2020).*
Machine generated translation of CN-208200702-U (Year: 2018).*
Machine generated translation of CN211942355U (Year: 2020).*
Machine generated translation of CN 108040809 A (Year: 2018).*
Machine generated translation of CN-112544396-A (Year: 2021).*
Machine generated translation of CN-212670173-U (Year: 2021).*
Machine generated translation of CN-105600951-A (Year: 2016).*
Xiong Xiang-Yan, et al., Analysis of Carbon Fixation and Oxygen Release Capabilities of 17 Afforestation Plants in Rural-urban Fringe in Beijing, Journal of Environmental Engineering Technology, 2014, pp. 248-255, vol. 4, No. 3.
Tan Rong Ping, Analysis of Carbon Emission in Highway Bridge Construction, Master Thesis of Engineering in Architecture & Civil Engineering, 2017, pp. 1-66, Changsha University of Science & Technology.
Zhou Yue, et al., Analysis on carbon emission for biological sewage sludge ceramsite aerated concrete block based on life cycle assessment, New Building Materials, 2017, pp. 34-38,51.

* cited by examiner

HIGHWAY SPONGE-TYPE COMPOSITE SIDE DITCH CARBON NEUTRALIZATION SYSTEM AND METHOD THEREOF

CROSS REFERENCE TO THE RELATED APPLICATIONS

This application is based upon and claims priority to Chinese Patent Application No. 202110410338.4, filed on Apr. 16, 2021, the entire contents of which are incorporated herein by reference.

TECHNICAL FIELD

The present invention relates to carbon neutralization and rainfall and flood utilization of highway side ditches, in particular to a highway sponge-type composite side ditch system and a design method thereof.

BACKGROUND

The goal visions of peak carbon dioxide emissions and carbon neutralization have been set out in China in order to cope with global climate changes. The transportation industry is a key final energy consumption industry in China, and the proportion of energy consumption is 8% of the total energy consumption in the whole society. Thus, carbon neutralization in the transportation industry will become one of the focuses of energy development in China in the new era. Carbon neutralization mainly focuses on reducing emissions of carbon dioxide and other greenhouse gases, increasing carbon sink and developing carbon capture and sequestration technologies, and we strive to achieve a balance between emission and absorption. Carbon neutralization is an optimal objective and effect of low-carbon technologies. Although many low-carbon technologies are available for highways, there is a great lack of technologies that can really achieve carbon neutralization.

Therefore, the present invention provides a highway side ditch structure enabling carbon neutralization throughout a life cycle and a design method thereof starting from the industrial characteristics of highway traffic infrastructure in response to the situation of global climate changes, and this side ditch also enables the sponge functions of runoff collection, guide and drainage, purification and utilization.

SUMMARY

The present invention provides a highway sponge-type composite side ditch system structure enabling safe and smooth collection, guide and drainage of highway runoff, having a good comprehensive effect of removing various pollutants from highway runoff, providing convenience and energy conservation in construction, simple management and maintenance, wide regional adaptability and good landscape effect, and combining the function of handling emergencies in leakage accidents of hazardous chemicals. Particularly, this structure can achieve the effect of carbon neutralization throughout a life cycle from raw material production, construction to operation.

A highway sponge-type composite side ditch carbon neutralization system is alternated with an ordinary side ditch, that is, upstream highway runoff flows from a water inlet ditch 1 of an ordinary side ditch structure into the highway sponge-type composite side ditch carbon neutralization system and flows out from a water outlet ditch 5 of the ordinary side ditch structure upon purification by the highway sponge-type composite side ditch carbon neutralization system. On the one hand, the highway sponge-type composite side ditch carbon neutralization system receives longitudinal road runoff collected by the ordinary side ditch of an upstream highway section; on the other hand, the highway sponge-type composite side ditch carbon neutralization system also receives transverse inflow of road runoff from this section of highway. The longitudinal road runoff and transverse road runoff are drained into the water outlet ditch 5 after combined purification such as deflection sedimentation, filtration, oil absorption, biodegradation, and plant absorption in the highway sponge-type composite side ditch carbon neutralization system.

The highway sponge-type composite side ditch carbon neutralization system of the present invention includes three units, i.e., a silt pre-sedimentation channel 2, a filtering and oil-absorbing channel 3 and an ecologic purification channel 4 which are connected horizontally and successively, and road runoff enters the silt pre-sedimentation channel from an inlet ditch (1), flows out from an outlet ditch (5) after being treated;

wherein a first water inlet 6 and a first water outlet 11 are arranged at middle-upper parts of a water inlet side and of a water outlet side of the silt pre-sedimentation channel 2 respectively, a sand collecting bucket 7 is arranged at the bottom of the water inlet side, used for collecting initially settled large sludge particles, a sludge converging slope 10 inclined at a certain angle from the water outlet side to the water inlet side is arranged at a bottom plate of the silt pre-sedimentation channel 2, so that sedimented silt converges towards the sand collecting bucket 7 and a sludge collecting tank 9 to facilitate periodic cleaning;

effluent water from the silt pre-sedimentation channel 2 is received by the filtering and oil-absorbing channel 3 through the first water outlet 11 at a middle-upper part of the water inlet side, a second water outlet 14 is arranged at the bottom of the water outlet side of the filtering and oil-absorbing channel 3, a second filtering layer 17, a first filtering layer 16 and an oil-absorbing fiber layer 15 are arranged in the filtering and oil-absorbing channel 3 from bottom to top, and grating plates 24 for preventing filter materials from floating up and flowing away are arranged at the top of the second filtering layer 17 and at the top of the first filtering layer 16; and effluent water from the filtering and oil-absorbing channel 3 is received by the ecologic purification channel 4 through the second water outlet 14 at the bottom of the water inlet side, a modified volcanic rock layer 18, a sawdust layer 19, a modified ceramsite layer 20, a configured planting soil layer 21 and carbon sink vegetation 22 are arranged successively in the ecologic purification channel 4 from bottom to top, and a third water outlet 23 is arranged over the configured planting soil layer 21 of the ecologic purification channel 4 at the water outlet side.

Further, a deflection baffle 8 is arranged upwards in the middle of the sludge converging slope 10 to change a water flow direction and improve a precipitation effect, and the deflection baffle 8 intersects with the sludge converging slope 10 to form a sludge collecting tank 9 to collect secondarily settled silt and suspended solids.

Further, grid cover plates 12 are arranged at the top of the silt pre-sedimentation channel 2 and the filtering and oil-absorbing channel 3 to enable direct suction by opening the grid cover plates once cleaning is required; impermeable layers 13 made of impermeable geotextiles are arranged at the bottom and side walls of the silt pre-sedimentation channel 2, the filtering and oil-absorbing channel 3 and the ecologic purification channel 4.

Further, additional spaces are also provided at an upper part of the silt pre-sedimentation channel 2 and the filtering and oil-absorbing channel 3, each of which occupies 20%-40% of the total space of each channel, and the spaces are used for buffering at the time of massive runoff inflow during rainstorm.

Further, a valve is arranged on the first water outlet 11, so that hazardous chemicals and leakage liquid thereof are stored in the silt pre-sedimentation channel after the valve is closed in case of a leakage accident of hazardous chemicals.

Further, a barrier net 25 is arranged at the second water outlet 14 to prevent filter materials from flowing into the ecologic purification channel 4.

Further, materials featuring good adsorption and filtration functions and a certain oil removing function are selected as filter materials for the second filtering layer 17, the first filtering layer 16 and the oil-absorbing fiber layer 15 in the filtering and oil-absorbing channel 3; still further, the filter materials filling the second filtering layer 17, the first filtering layer 16 and the oil-absorbing fiber layer 15 in the filtering and oil-absorbing channel 3 from bottom to top are successively and preferably polyether sponge, polyester sponge and oil-absorbing fiber because both polyether sponge and polyester sponge are macroporous lightweight materials with very large specific surface areas and good adsorption, filtration and purification effects, and the oil-absorbing fiber 15 is preferably made of a nano oil-absorbing material.

Further, the configured planting soil layer 21 is 10-15 cm below the road surface and is used to increase a buffer time of transverse runoff infiltration on this highway section.

Further, the modified volcanic rock layer in the ecologic purification channel 4 is 40-70 cm high, filled with modified volcanic rocks with a particle size of 50 mm. The modified volcanic rocks are mainly prepared by mixing and processing conventional volcanic rocks and powdered activated carbon, with a better adsorption effect.

Further, the sawdust layer is 10-30 cm high, filled with sawdust with a particle size of 30 mm and doped with microbial quick-dissolving balls at a volume ratio of 10%. The sawdust is used to increase carbon sources for nitrification and denitrification and improve a microbial degradation effect.

Further, the modified ceramsite layer is 50-80 cm high, filled with modified ceramsites with a particle size of 20 mm and doped with microbial quick-dissolving balls at a volume ratio of 20%. The modified ceramsites are formed by combined processing of zeolite, fly ash and calcium carbonate, with a high porosity, adsorbability, ion exchange property and microbial affinity.

Further, the microbial quick-dissolving balls are internally filled with functional microorganisms for deep nitrogen and phosphorus removal, preferred solutions of the microorganisms are *bacillus, Rhodobacter* and *Exiguobacterium* sp., and the microbial quick-dissolving balls are externally packed with PVA and gradually dissolved in water, so that the functional microorganisms are uniformly dispersed into the sawdust layer and the modified ceramsite layer.

Further, local planting soil and yellow sand are used in the configured planting soil layer, and the volume ratio of planting soil to yellow sand is 70:30; local vegetation with a good effect of carbon sink is used as the carbon sink vegetation, and a planting ratio is determined according to a carbon neutralization configuration method.

The present invention also provides a method for designing a highway sponge-type composite side ditch system, including the following steps:

Step 1. determining a length L of a catchment unit according to a highway grade and a total length of a catchment section;

Step 2. determining a length (generally taken as 30%-50% of the length of the catchment unit) of a sponge-type composite side ditch according to a polluting property of road runoff in combination with a road width, pollutant removal efficiency and hydraulic loading;

Step 3. calculating a total road runoff converging towards the sponge-type composite side ditch within the length of the catchment unit, i.e., volume $V_1$ of the silt pre-sedimentation channel of the unit, which is calculated by the following formula:

$$V_1 = q \cdot \Psi \cdot F \cdot t / 1000$$

where: $V_1$ is a volume of the silt pre-sedimentation channel of the unit (m³); q is a design rainstorm intensity (L/(s·hm²)); $\Psi$ is a runoff coefficient; F is a catchment area (hm²); t is a rainfall collection time (s);

Step 4. determining the dimensions of the silt pre-sedimentation channel of the unit determining a width $b_1$ (generally taken as 0.8-2 m) of the silt pre-sedimentation channel of the unit according to the roadside site space, taking a depth $h_1$ of the silt pre-sedimentation channel of the unit as 1.0-1.8 m, with a calculation formula for a length $L_1$ of the silt pre-sedimentation channel of the unit as follows:

$$L_1 = V_1 / (b_1 \cdot h_1)$$

Step 5. determining the dimensions of the filtering and oil-absorbing channel of the unit considering convenience in construction and easy mechanization, it is appropriate that a width $b_2$ of the filtering and oil-absorbing channel of the unit is consistent with $b_1$ and a depth $h_2$ of the filtering and oil-absorbing channel of the unit is consistent with $h_1$, and a length $L_2$ of the filtering and oil-absorbing channel of the unit is taken as 60%-80% of $L_1$;

Step 6. determining the dimensions of the ecologic purification channel of the unit considering convenience in construction and easy mechanization, it is appropriate that a depth $h_3$ of the ecologic purification channel of the unit is consistent with $h_1$, and a total length $(L_1+L_2+L_3)$ of the highway sponge-type composite side ditch carbon neutralization system of the unit is 30%-50% of the length L of the catchment unit, with the calculation formula for a length $L_3$ of the ecologic purification channel of the unit as follows:

$$L_3 = (0.3-0.5) \cdot L - L_1 - L_2$$

Step 7. all the main raw materials, i.e., modified volcanic rocks, sawdust, planting soil and yellow sand, for the highway sponge-type composite side ditch carbon neutralization system are natural materials without carbon emission involved; carbon emission can be generated during production of polyether sponge, polyester sponge, oil-absorbing fibers and modified ceramsite, a carbon emission $Q_1$ in a production stage of raw materials for the highway sponge-type composite side ditch carbon neutralization system can be measured and calculated according to material consumption and a corresponding carbon emission coefficient, with the calculation formula as follows:

$$Q_1 = \sum_{i=1}^{n}(q_i \times u_i),$$

where: $q_i$ is a carbon emission coefficient of the $i^{th}$ non-natural raw material, in kg $CO_2$/t;
$u_i$ is a consumption of the $i^{th}$ non-natural raw material, in t;
n is a type number of the non-natural raw materials; and
i represents various non-natural raw materials;

Step 8. determining a carbon emission $Q_2$ in a construction stage of the highway sponge-type composite side ditch carbon neutralization system, which include two parts: carbon emission from construction machinery and carbon emission from transportation of raw materials, with the calculation formula for the carbon emission $Q_2$ in a construction stage as follows:

$$Q_2 = \sum_{i_1=1}^{n_1}(u_{i1} \times e_{i1}) \times k + \sum_{j=1}^{m}(f_j \times g_j)$$

where: $u_{i1}$ is a consumption of the $i_1^{th}$ raw material, in t;
$e_{i1}$ is a transportation distance of the $i_1^{th}$ raw material, in km;
k is a carbon emission from transportation per unit distance, in kg $CO_2$/(t·km);
$n_1$ is a type number of raw materials;
$i_1$ represents various raw materials;
$f_j$ is a quantity of the $j^{th}$ construction machine, in m³;
$g_j$ is a carbon emission per unit quantity from the $j^{th}$ construction machine, kg $CO_2$/m³;
m is a type number of construction machines; and
j represents various construction machines;

Step 9. selecting a combination of local high-carbon-sink arbor, shrub and grass to improve a carbon fixation effect while giving consideration to the long-term stability and landscape value of vegetation groups, with the formula for calculating a total carbon sink $Q_3$ during a 20-year operation life cycle of the highway sponge-type composite side ditch carbon neutralization system of the unit as follows:

$$Q_3 = \sum_{v=1}^{t}(p_v \times r_v) \times S \times D$$

where: $p_v$ is a daily carbon fixation coefficient per unit area for the $v^{th}$ carbon sink vegetation, in kg $CO_2$/(m²·d);
$r_v$ is a planting area ratio of the vth carbon sink vegetation, in %;
S is an upper surface area of the ecologic purification channel of the unit, in m²;
D is an operation duration of the side ditch, in d;
t is a species number of carbon sink vegetation; and
v represents various carbon sink vegetations; and Step 10. realizing carbon neutralization throughout the life cycle of the highway sponge-type composite side ditch carbon neutralization system, i.e., $Q_1+Q_2=Q_3$, with the calculation formula for a width $b_3$ of the ecologic purification channel of the unit as follows:

$$b_3 = \frac{\sum_{i=1}^{n}(q_i \times u_i) + \sum_{i_1=1}^{n_1}(u_{i1} \times e_{i1}) \times k + \sum_{j=1}^{m}(f_j \times g_j)}{\sum_{v=1}^{t}(p_v \times r_v) \times D \times L_3}.$$

Further, step 3 specifically includes the following steps:
① querying a calculation formula of regional rainstorm intensity, determining a reappearing period and a rainfall duration according to relevant standards, and calculating the local design rainstorm intensity q;
② determining the runoff coefficient ψ of a road to be collected in accordance with Table 1 by road coverage type;

TABLE 1

List of Runoff Coefficients

| Coverage Type | Runoff Coefficient Ψ |
|---|---|
| Various roofs, concrete and asphalt road surfaces | 0.90 |
| Road surfaces paved with rock blocks, and broken stone road surfaces treated by asphalt pavement | 0.60 |
| Road surfaces dry-laid with bricks and stones and broken stones | 0.40 |
| Unpaved earth surface | 0.30 |
| Green land and grassland | 0.15 |

③ calculating the catchment area F according to the actual total area of road surface catchment and slope surface catchment on a highway; and
④ determining the rainfall collection time (generally taken as 1,200-1,800 s) according to the pollution degree of local initial rainwater runoff.

Further, the length L of the catchment unit is 100 m-300 m; the length of the sponge-type composite side ditch is taken as 30%-50% of the length of the catchment unit.

Compared with the prior art, the present invention is characterized in that:

1. The highway sponge-type composite side ditch carbon neutralization system provided by the present invention mainly includes three units, i.e., a silt pre-sedimentation channel, a filtering and oil-absorbing channel and an ecologic purification channel, wherein the silt pre-sedimentation channel removes large particles of silt and suspended solids in initial rainwater runoff through deflection sedimentation; the filtering and oil-absorbing channel mainly provides a buffer security function for the ecologic purification channel that follows through the effects of adsorption and filtration while combining a function of oil absorption; the ecologic purification channel is used for deep rainfall runoff purification through microbial degradation, medium adsorption and plant absorption. On the basis of implementation of the fundamental functions, such as rainwater catchment, guide and drainage through side ditches on highways, the three units are well-coordinated and inter-connected with each other to reinforce a runoff purification effect, and conditions for storm flood utilization are also provided to jointly achieve the low-impact development functions of the highway sponge-type side ditches.

2. Various technical measures have been taken for the highway sponge-type composite side ditch carbon neutralization system to reduce carbon emission and enhance a carbon sink effect, so that an effect of carbon neutralization throughout a life cycle can be achieved. In the production stage of raw materials, natural building materials are used as much as possible, and use of cement, sandstones and other materials with high emissions from production is reduced; lightweight materials are used as much as possible in the construction stage to reduce carbon emission from construction machinery and carbon emission from transportation of raw materials; the offset of the carbon sink effect with carbon emission from raw material production and construction and carbon emission from construction is achieved throughout an operation cycle by planting high-carbon-sink vegetations, increasing a planting area and improving a carbon sink effect in an operation stage.
3. By integrating various factors such as rainstorm intensity, polluting property of road runoff, pollutant removal efficiency, hydraulic loading, measurement and calculation of carbon emission and carbon sink calculation, a full set of design methods for the highway sponge-type composite side ditch carbon neutralization system is provided, the catchment unit is divided into several parts, a structure and a specific size of each part are scientifically determined, and a method for calculating carbon emission in all stages of a life cycle has been invented.
4. The sand collecting bucket, sludge collecting tank and sludge converging slope are arranged in the silt pre-sedimentation channel to facilitate sludge converging and periodic cleaning.
5. The filtering and oil-absorbing channel is filled with: two macroporous lightweight materials with a high specific surface area and the functions of good adsorption, filtration and purification; and nano oil-absorbing fiber to realize a function of oil slick absorption and facilitate regular replacement.
6. Composite structures such as modified volcanic rock layer, sawdust layer, modified ceramsite layer, configured planting soil layer and carbon sink vegetation are arranged in the ecologic purification channel. The modified volcanic rocks have a good absorbing effect; the sawdust is used to increase carbon sources for nitrification and denitrification and improve a microbial degradation effect; the modified ceramsites have a very high porosity, adsorbability, ion exchange property and microbial affinity and enable deep nitrogen and phosphorous removal; local planting soil and yellow sand are used in the configured planting soil layer to improve a permeability coefficient and facilitate rapid infiltration of rainwater; local high-carbon-sink vegetations are selected as the carbon sink vegetation while consideration is given to the long-term stability and landscape value of vegetation groups.
7. The sawdust layer and modified ceramsite layer of the ecologic purification channel are filled with the microbial quick-dissolving balls in a certain proportion. The microbial quick-dissolving balls are internally filled with functional microorganisms for deep nitrogen and phosphorous removal, externally packed with PVA and gradually dissolved in water, so that the functional microorganisms are uniformly dispersed.
8. Additional spaces are provided at upper parts of the silt pre-sedimentation channel and of the filtering and oil-absorbing channel to buffer high-intensity rainstorm runoff.
9. Impermeable layers are arranged at the bottom and side walls of the highway sponge-type composite side ditch carbon neutralization system to guarantee that underground water will not be polluted in case of leakage of hazardous chemicals. In case of leakage of hazardous articles, the silt pre-sedimentation channel and the filtering and oil-absorbing channel can be disconnected by gate control, so that leakage from the hazardous articles can be trapped to thoroughly control water environment risks.

Figure 1:
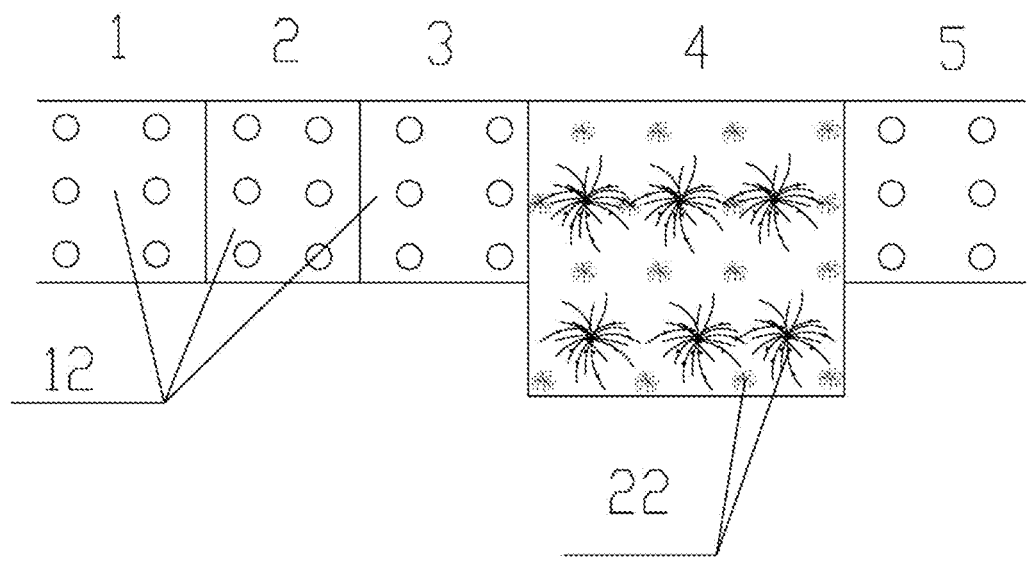
FIG. 1 is a plane view of a highway sponge-type composite side ditch carbon neutralization system.
Figure 2:
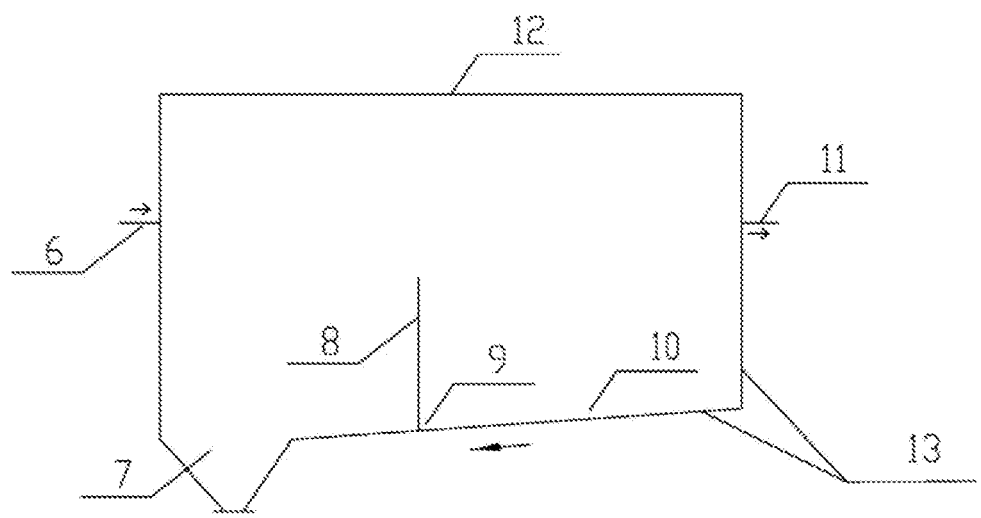
FIG. 2 is a structural view of a silt pre-sedimentation channel.
Figure 3:
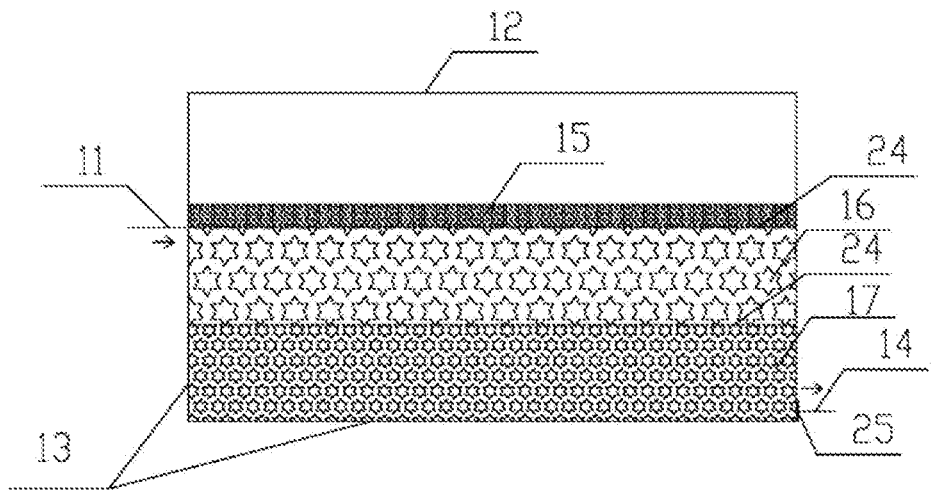
FIG. 3 is a structural view of a filtering and oil-absorbing channel.
Figure 4:
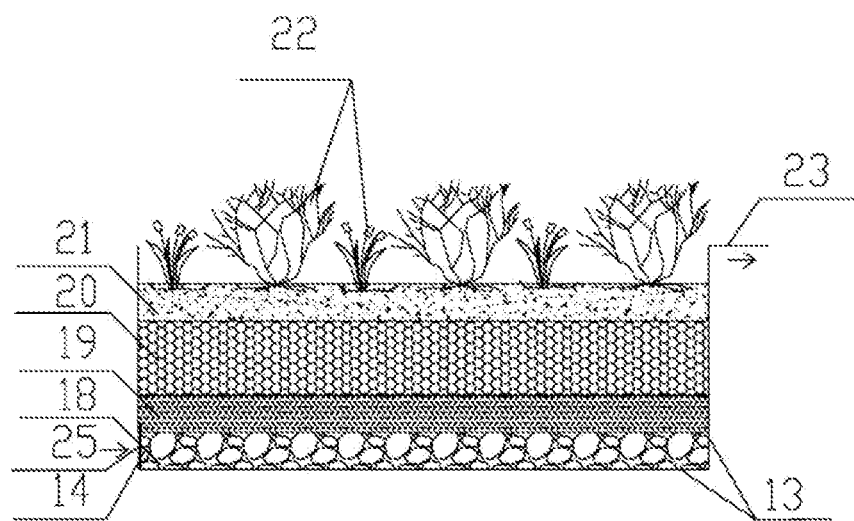
FIG. 4 is a structural view of an ecologic purification channel.

| | |
|---|---|
| 1: | Inlet ditch |
| 2: | Silt pre-sedimentation channel |
| 3: | Filtering and oil-absorbing channel |
| 4: | Ecologic purification channel |
| 5: | Outlet ditch |
| 6: | First water inlet |
| 7: | Sand collecting bucket |
| 8: | Deflection baffle |
| 9: | Sludge collecting tank |
| 10: | Sludge converging slope |
| 11: | First water outlet |
| 12: | Grid cover plate |
| 13: | Impermeable layer |
| 14: | Second water outlet |
| 15: | oil-absorbing fiber layer |
| 16: | First filtering layer |
| 17: | Second filtering layer |
| 18: | Modified volcanic rock layer |
| 19: | Sawdust layer |
| 20: | Modified ceramsite layer |
| 21: | Configured planting soil layer |
| 22: | Carbon sink vegetation |
| 23: | Third water outlet |
| 24: | Grating plate |
| 25: | Barrier net |

DETAILED DESCRIPTION OF THE EMBODIMENTS

In order to further elaborate the technical means adopted in the present invention to achieve the intended purpose of the present invention and the efficacy thereof, the specific implementation modes, steps, structure, characteristics and efficacy of the highway sponge-type composite side ditch carbon neutralization system provided on the basis of the present invention are described in detail below in conjunction with the accompanying drawings and preferred embodiments.

Example 1

A highway sponge-type composite side ditch carbon neutralization system includes a silt pre-sedimentation channel, a filtering and oil-absorbing channel and an ecologic purification channel which are connected successively. Ordinary side ditches are arranged ahead of and behind the highway sponge-type composite side ditch carbon neutralization system and alternated with each other. Impermeable geotextiles (two fabrics and one membrane) are laid at the bottom and side walls of the highway sponge-type composite side ditch carbon neutralization system.

Upstream longitudinal road runoff collected by the inlet ditch flows into the first water inlet at a middle-upper part of a water inlet side of the silt pre-sedimentation channel, and first-stage purification is performed in the silt pre-sedimentation channel under the action of deflection sedimentation. After purification, the upstream longitudinal road runoff flows out from the first water outlet at a middle-upper part of a water outlet side of the silt pre-sedimentation channel and enters from a middle-upper part of a water inlet side of the filtering and oil-absorbing channel. After second-stage purification processes such as adsorption by the oil-absorbing fiber in the upper layer and filtration by filter materials in middle and lower layers, the upstream longitudinal road runoff flows out from the second water outlet at the bottom of a water outlet side of the filtering and oil-absorbing channel and enters from the bottom of a water inlet side of the ecologic purification channel. After third-stage purification such as deep adsorption and filtration by the modified volcanic rocks, biodegradation by the sawdust layer and modified ceramsite layer, plant absorption and the like, the upstream longitudinal road runoff flows out from the third water outlet at an upper part of the water outlet side of the ecologic purification channel and flows into the outlet ditch. The transverse runoff in this highway section flows into the silt pre-sedimentation channel, filtering and oil-absorbing channel and ecologic purification channel respectively from top to bottom through the grid cover plates arranged at the top of the silt pre-sedimentation channel and of the filtering and oil-absorbing channel and the carbon sequestration vegetation and planting soil at the top of the ecologic purification channel.

A first water inlet and a first water outlet are arranged at a two-thirds point (calculated from the bottom) of a total height of the silt pre-sedimentation channel, and a deflection baffle with a total height of one-second is arranged upwards at a one-third point (at the water inlet side) of a total length of the bottom. A sludge converging slope with an inclination angle of 3% is arranged towards the water inlet side at the bottom. A circular-hole cover plate of a steel concrete structure is arranged at the top of the silt pre-sedimentation channel to facilitate opening and cleaning. A valve is arranged at the first water outlet, so that hazardous chemicals and leakage liquid thereof are stored in the silt pre-sedimentation channel after the valve is closed in case of a leakage accident of hazardous chemicals, and then the hazardous chemicals and leakage liquid are pumped out and disposed by an environmental protection authority to avoid polluting surrounding water bodies and groundwater.

A second filtering layer, a first filtering layer and an oil-absorbing fiber layer are arranged in the filtering and oil-absorbing channel from bottom to top, the heights of these three layers are 30%, 25% and 5% of the total height respectively, and the remaining 40% is an additional space for buffering during rainstorm. The second filtering layer is filled with polyether sponge as filter material, the first filtering layer is filled with polyester sponge as filter material, the oil-absorbing fiber layer is filled with nano oil-absorbing fiber as filter material, the polyether sponge is of a 10 mm×10 mm mesoporous structure, and the polyester sponge is of a 20 mm×20 mm macroporous structure. Glass fiber grating plates are arranged at both the top of the second filtering layer and the top of the first filtering layer to prevent loss of the polyether sponge and polyester sponge in case of flooding. A circular-hole cover plate of a steel concrete structure is arranged at the top of the filtering and oil-absorbing channel to facilitate opening and cleaning.

A modified volcanic rock layer, a sawdust layer, a modified ceramsite layer, a configured planting soil layer and carbon sink vegetation are arranged successively from bottom to top in the ecologic purification channel. The modified volcanic rock layer is 40 cm high, filled with modified volcanic rocks with a particle size of 50 mm. The sawdust layer is 15 cm high, filled with sawdust with a particle size of 30 mm, and doped with microbial quick-dissolving balls at a volume ratio of 10%. The modified ceramsite layer is 50 cm high, filled with modified ceramsites with a particle size of 20 mm, and doped with microbial quick-dissolving balls at a volume ratio of 20%. The modified ceramsites are prepared by processing zeolite, fly ash, calcium carbonate and the like. The configured planting soil layer is 15 cm high, local planting soil and yellow sand are used, and the volume ratio of planting soil to yellow sand is 70:30. *Prunus triloba, forsythia* and *Zoysia japonica* are used as carbon sink vegetation. The configured planting soil layer is 10 cm below a road surface.

The microbial quick-dissolving balls are internally filled with functional microorganisms which are mainly *bacillus, Rhodobacter* and *Exiguobacterium* sp. The microbial quick-dissolving balls are externally packed with a quick-dissolving material PVA and gradually dissolved in water to obtain an effect of uniform dispersion, so that microbial floras in the whole ecologic purification channel are distributed uniformly and stably. The microbial quick-dissolving balls not only have an extremely high removal efficiency for COD, but also enable deep nitrogen and phosphorous removal.

Example 2

The sponge-type composite side ditch carbon neutralization system is implemented at a two-way four-lane highway, a design length of the catchment unit is 100 m, a length of the sponge-type composite side ditch of the unit is 45 m, wherein the silt pre-sedimentation channel of the unit is 8 m long, the filtering and oil-absorbing channel of the unit is 5 m long, and the ecologic purification channel of the unit is 32 m long.

The silt pre-sedimentation channel of the unit is 1.5 m deep, 1 m wide, with a volume of 12 $m^3$. The filtering and oil-absorbing channel of the unit is 1.5 m deep, 1 m wide, with a volume of 7.5 $m^3$. The ecologic purification channel of the unit is 1.5 m deep, 2 m wide, at a length-width ratio of 16:1, with a volume of 96 $m^3$.

Considering a long distance for transportation of raw materials such as polyester sponge and polyether sponge around a highway, in order to reduce project costs and carbon emission in a construction stage, zeolite with a height of 50 cm and a particle size of 20 mm and block stones with a height of 50 cm and a particle size of 30 mm are laid in the filtering and oil-absorbing channel from bottom to top to replace the second filtering layer and first filtering layer, and a 5 cm oil-absorbing fiber layer is arranged.

The modified volcanic rock layer of the ecologic purification channel is 50 cm high, filled with modified volcanic rocks with a particle size of 50 mm. The sawdust layer is 20 cm high, filled with sawdust with a particle size of 30 mm. The modified ceramsite layer is 60 cm high, filled with modified ceramsites with a particle size of 20 mm. The configured planting soil layer is 10 cm high, the volume ratio of planting soil to yellow sand is 70:30, and the configured planting soil layer is 10 cm below the road surface. Two rows of shrub are planted as the carbon sink vegetation, with a line spacing of 0.5 m: including one row of *Ligustrum vicaryi*, with a crown diameter of 30 cm and a row spacing of 1.0 m; and one row of purple-leaf plum, with a crown diameter of 20 cm and a row spacing of 1.0 m. The ecologic purification channel is fully covered with premature grass turf.

The carbon emissions throughout a carbon life cycle of the sponge-type composite side ditch are measured and calculated as follows:

(1) Carbon Emission in a Production Stage of Raw Materials

The main raw materials for the highway sponge-type composite side ditch carbon neutralization system in this example are modified volcanic rocks, sawdust, zeolite, block stones, planting soil and yellow sand, all of which are natural materials and basically do not involve carbon emission. The modified ceramsites being fired will produce carbon emission, with a carbon emission coefficient of 135.52 kg $CO/m^3$ according to the literature. A 45 m highway sponge-type composite side ditch carbon neutralization system is filled with modified ceramsites with a volume of 19.2 $m^3$, and the carbon emission is 2.60 t.

(2) Carbon Emission in a Construction Stage

The carbon emission from construction of the highway sponge-type composite side ditch carbon neutralization system in this example mainly comes from the transportation and filling of various materials, the oil consumption level of highway diesel transportation is $3.23 \times 10^{-5}$ tce/(t·km) according to the literature, and the carbon emission in the construction stage of the 45 m highway sponge-type composite side ditch carbon neutralization system is measured and calculated as 0.51 t.

(3) Carbon Sink in an Operation Stage

According to the literature, *Ligustrum vicaryi* (with a carbon fixation coefficient of 27.69 g/d) and purple-leaf plum (with a carbon fixation coefficient of 32.87 g/d) with the best carbon sink effect locally are selected as the carbon sink vegetation, and premature grass (with a carbon fixation coefficient of 11.50 g/d) with the best carbon sink effect among herbaceous plants is selected. A daily fixed carbon content of the 45 m highway sponge-type composite side ditch carbon neutralization system is calculated as 0.33 kg, and a total fixed carbon content throughout a 20-year operation period is 3.11 t according to a planting condition of shrub and herbaceous plant.

From the perspective of a whole life cycle of the highway sponge-type composite side ditch carbon neutralization system, the carbon emission is 3.11 t, the carbon sink is also 3.11 t, "zero emission" of carbon dioxide in the life cycle is realized, and this technology has become a true carbon neutralization technology in a life cycle of a highway.

1. Pollutant Removal Capacity of the Highway Sponge-Type Composite Side Ditch Carbon Neutralization System Experiment Example 1

The highway sponge-type composite side ditch carbon neutralization system is as described in example 1. Samples were taken at the water inlet ditch, the silt pre-sedimentation channel, the water inlet of the filtering and oil-absorbing channel, the water outlet of the filtering and oil-absorbing channel and the water outlet of the ecologic purification channel respectively, the contents of pollutants TN, TP, COD and SS in the water samples in different positions were determined, wherein a total nitrogen (TN) was determined by potassium persulfate digestion-ultraviolet spectrophotometry, a total phosphorus (TP) was determined by phenol-hypochlorite spectrophotometry, a chemical oxygen demand (COD) was determined by a potassium dichromate method, and suspended solids (SS) were determined by a weighting method after dried. The test results are described in Table 2.

TABLE 2

Purification Effect of Highway Sponge-type Composite Side Ditch Carbon Neutralization System (mg/L)

| Sampling Site | TN | TP | COD | SS |
|---|---|---|---|---|
| Inlet ditch | 5.4 | 0.2 | 53 | 305 |
| Effluent from the silt pre-sedimentation channel | 2.8 | 0.15 | 32 | 130 |
| Effluent from the filtering and oil-absorbing channel | 1.5 | 0.07 | 18 | 50 |
| Effluent from the ecologic purification channel | 0.9 | 0.05 | 8 | 25 |

Experimental result: Table 2 shows that the system provided by the present invention has a good purification effect on various pollutants in highway runoff.

2. Selection of Species of Microorganisms Filling the Microbial Quick-Dissolving Balls Nitrogen and phosphorus are main nutrient substances that induce water eutrophication. Studies indicate that some of the microorganisms have a higher nitrogen and phosphorus removal capacity. This experiment mainly investigated an influence of the species of microorganisms filling microbial quick-dissolving balls on a runoff purification effect. Different species of microorganisms were embedded in PVA and added into an organic glass reactor, a simulative water sample (with a total nitrogen concentration of 20 mg/L, a total phosphorus concentration of 2 mg/L) was added, and dissolved oxygen was controlled by aeration with DO=2-3 mg/L. A sample was taken in 10 h, and a total nitrogen concentration and a total phosphorus concentration were tested. This experiment was repeated three times for each microorganism species, and the results were averaged.

Experiment Example 2

The highway sponge-type composite side ditch carbon neutralization system is as described in example 1, wherein the microorganism filling the microbial quick-dissolving balls was *bacillus*.

Experiment Example 3

The highway sponge-type composite side ditch carbon neutralization system is as described in example 1, wherein the microorganism filling the microbial quick-dissolving balls was *Rhodobacter*.

Experiment Example 4

The highway sponge-type composite side ditch carbon neutralization system is as described in example 1, wherein the microorganism filling the microbial quick-dissolving balls was *Exiguobacterium* sp.

Experiment Example 5

The highway sponge-type composite side ditch carbon neutralization system is as described in example 1, wherein the microorganism filling the microbial quick-dissolving balls was *Thauerasp*.

Experiment Example 6

The highway sponge-type composite side ditch carbon neutralization system is as described in example 1, wherein the microorganism filling the microbial quick-dissolving balls was *Rhodopseudomonas rutila*.

TABLE 3

Influence of the Species of Microorganisms Filling the Microbial Quick-dissolving Balls on the Runoff Purification Effect

| | Initial total nitrogen concentration (mg/L) | Total ammonia concentration in 10 h (mg/L) | Nitrogen removal rate (%) | Initial total phosphorus concentration (mg/L) | Total phosphorus concentration in 10 h (mg/L) | Phosphorus removal rate (%) |
|---|---|---|---|---|---|---|
| Example 2 | 20 | 7.8 | 61 | 2 | 0.59 | 70.5 |
| Example 3 | 20 | 6.3 | 68.5 | 2 | 0.71 | 64.5 |
| Example 4 | 20 | 8.2 | 59 | 2 | 0.67 | 66.5 |
| Example 5 | 20 | 10.7 | 46.5 | 2 | 1.31 | 34.5 |
| Example 6 | 20 | 11.4 | 43 | 2 | 1.24 | 38 |

Experimental result: As shown in Table 3, the nitrogen and phosphorus removal effects of *bacillus*, *Rhodobacter* and *Rhodopseudomonas rutila* were relatively good. Thus, *bacillus*, *Rhodobacter* and *Rhodopseudomonas rutila* were preferred functional microorganisms embedded in the microbial quick-dissolving balls.

3. Comparison of Sewage Purification Effects of Different Kinds of Filter Materials for the Filtering and Oil-Absorbing Channel Experiment Example 7

The filtering and oil-absorbing channel is as shown in example 1, wherein the polyester sponge material was selected for the first filtering layer, the polyether sponge material was selected for the second filtering layer, and no oil-absorbing fiber layer was set.

Experimental method: Samples were continuously introduced from the first water outlet by continuous water feeding, and the samples were simulative water samples with pollutant indexes as shown in Table 4. The samples were taken from the second water outlet after 10 h, and the contents of pollutants TN, TP, COD and SS in the samples were tested. A method for determining the contents of pollutants is as shown in example 1.

Experiment Example 8

The filtering and oil-absorbing channel is as shown in example 1, wherein the polyester sponge material was selected for the first filtering layer, a foamed polypropylene material was selected for the second filtering layer, and no oil-absorbing fiber layer was set.

Experiment Example 9

The filtering and oil-absorbing channel is as shown in example 1, wherein the foamed polypropylene material was selected for the first filtering layer, the polyether sponge material was selected for the second filtering layer, and no oil-absorbing fiber layer was set.

TABLE 4

Comparison of Sewage Purification Effects of Different Kinds of Filter Materials for the Filtering and Oil-absorbing Channel

| | TN (mg/L) | TP (mg/L) | COD | SS (mg/L) |
|---|---|---|---|---|
| Simulative water sample | 6.7 | 0.27 | 71 | 383 |
| Example 7 | 4.1 | 0.19 | 39 | 142 |
| Example 8 | 4.6 | 0.22 | 46 | 153 |
| Example 9 | 4.5 | 0.23 | 41 | 166 |

Experimental result: As shown in Table 4, a purification effect of polyester sponge and that of polyether sponge are superior to that of the foamed polypropylene material, thus polyester sponge and polyether sponge are preferred filtering layer materials for the filtering and oil-absorbing channel.

The contents described above are only the preferred embodiments of the present invention and are not intended to limit the present invention in any form. Although the present invention has been disclosed above by the preferred embodiments, the preferred embodiments are not used to limit the present invention. Any technician familiar with this specialty can make some variations or modifications as equivalent embodiments with equivalent changes using the technical contents revealed above without departing from the scope of the technical solution of the present invention. However, for all those contents not departing from the scope of the technical solution of the present invention, any simple amendment, equivalent change and modification performed on the above examples according to the technical essence of the present invention still fall within the scope of the technical solution of the present invention.

The invention claimed is:

1. A highway sponge-type composite side ditch carbon neutralization system, comprising three units, wherein the three units are a silt pre-sedimentation channel, a filtering and oil-absorbing channel, and an ecologic purification channel, wherein, the silt pre-sedimentation channel, the filtering and oil-absorbing channel, and the ecologic purification channel are connected horizontally and successively;

road runoff enters the silt pre-sedimentation channel from an inlet ditch, flows into the filtering and oil-absorbing channel from the silt pre-sedimentation channel, consecutively flows into the ecological purification channel and flows out from an outlet ditch after being treated, wherein the silt pre-sedimentation channel comprises:
- a first water inlet and a first water outlet arranged at middle-upper parts of a first water inlet side and a first water outlet side of the silt pre-sedimentation channel respectively;
- a sand collecting bucket arranged at a first bottom portion towards the first water inlet side; and
- a sludge converging slope inclined at an angle from the first water outlet side towards the first water inlet side, wherein the sludge converging slope is arranged at a bottom plate of the silt pre-sedimentation channel;

effluent water from the silt pre-sedimentation channel is received by the filtering and oil-absorbing channel through the first water outlet at a middle-upper part of a second water inlet side of the filtering and oil-absorbing channel wherein, the filtering and oil-absorbing channel further comprises:
- a second water outlet arranged at a bottom portion of a second water outlet side of the filtering and oil-absorbing channel;
- a second filtering layer comprising second filter materials;
- a first filtering layer comprising first filter materials; and
- an oil-absorbing fiber layer; and
- grating plates, wherein,
    - the second filtering layer, the first filtering layer and the oil-absorbing fibre layer are arranged in the filtering and oil-absorbing channel from bottom to top; and
    - the grating plates are arranged at a top of the second filtering layer and at a top of the first filtering layer, wherein the grating plates are configured to prevent filter materials from floating up and floating away;

effluent water from the filtering and oil-absorbing channel is received by the ecologic purification channel through the second water outlet into a third water inlet at a bottom portion of a third water inlet side of the ecological purification channel, wherein the ecologic purification channel comprises:
- a modified volcanic rock layer;
- a sawdust layer;
- a modified ceramsite layer comprising modified ceramsites, wherein the modified ceramsite is formed by combined processing of zeolite, fly ash and calcium carbonate;
- a configured planting soil layer;
- carbon sink vegetation; and
- a third water outlet, wherein,
- the modified volcanic rock layer, the sawdust layer and the modified ceramsite layer are arranged successively in the ecologic purification channel from bottom to top;
- the sawdust layer is filled with sawdust, wherein each of the sawdust particle has a particle size of 30 mm and the sawdust layer is doped with microbial quick-dissolving balls at a volume ratio of 10%;
- the modified ceramsite layer is filled with modified ceramsites, wherein each of modified ceramsite has a particle size of 20 mm and the ceramsite layer is doped with microbial quick-dissolving balls at a volume ratio of 20%, wherein, each of the microbial quick-dissolving balls in the saw dust layer and the modified ceramsite layer are configured to be:
    - internally filled with functional microorganisms for deep nitrogen and phosphorus removal; and
    - externally packed with PVA that gradually dissolves in water to uniformly disperse the functional microorganisms filled within; and
- the third water outlet is arranged over the configured planting soil layer of the ecologic purification channel at a third water outlet side.

2. The highway sponge-type composite side ditch carbon neutralization system according to claim 1, wherein a deflection baffle is arranged upwards in a middle of the sludge converging slope, and the deflection baffle intersects with the sludge converging slope to form a sludge collecting tank.

3. The highway sponge-type composite side ditch carbon neutralization system according to claim 1, wherein,
- grid cover plates are arranged at top portions of the silt pre-sedimentation channel and the filtering and oil-absorbing channel;
- additional spaces are provided at an upper part of the silt pre-sedimentation channel and the filtering and oil-absorbing channel for a purpose of buffering a rainstorm runoff; and
- impermeable layers made of impermeable geotextiles are arranged on the bottom plate and side walls of the silt pre-sedimentation channel, the filtering and oil-absorbing channel, and the ecologic purification channel.

4. The highway sponge-type composite side ditch carbon neutralization system according to claim 1, wherein a valve is arranged at the first water outlet; and a barrier net is arranged at the second water outlet.

5. The highway sponge-type composite side ditch carbon neutralization system according to claim 1, wherein materials that is used for adsorption, filtration and for removing oil are selected as filter materials for the second filtering layer, the first filtering layer and the oil-absorbing fiber layer, in the filtering and oil-absorbing channel.

6. The highway sponge-type composite side ditch carbon neutralization system of claim 5, wherein
- the second filtering layer is filled with polyether sponge as a filter material;
- the first filtering layer is filled with the polyester sponge as the filter material; and
- the oil-absorbing fiber layer is filled with nano oil-absorbing material as the filter material.

7. The highway sponge-type composite side ditch carbon neutralization system according to claim 1, wherein,
- the modified volcanic rock layer in the ecologic purification channel is 40-70 cm high, filled with modified volcanic rocks with a particle size of 50 mm;
- the sawdust layer is 10-30 cm high;
- the modified ceramsite layer is 50-80 cm high;
- planting soil and yellow sand are used in the configured planting soil layer, and a volume ratio of the planting soil to the yellow sand is 70:30;
- vegetation with a carbon sink effect is used as the carbon sink vegetation.

8. The highway sponge-type composite side ditch carbon neutralization system according to claim 7, wherein the functional microorganisms in the microbial quick-dissolving balls are selected from a group consisting of *bacillus, Rhodobacter* and *Exiguobacterium* sp.

* * * * *